United States Patent
Chae et al.

(10) Patent No.: US 10,214,658 B2
(45) Date of Patent: Feb. 26, 2019

(54) METHOD OF THREE-DIMENSIONAL PRINTING

(71) Applicant: LOTTE CHEMICAL CORPORATION, Seoul (KR)

(72) Inventors: Byung Hun Chae, Daejeon (KR); Sung Won Jung, Anyang-si (KR); Jung Yeop Lee, Daejeon (KR); Hyun Yul Woo, Daejeon (KR); Youn Jin Hong, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 16/118,803

(22) Filed: Aug. 31, 2018

(65) Prior Publication Data

US 2018/0371283 A1 Dec. 27, 2018

Related U.S. Application Data

(63) Continuation of application No. 14/921,544, filed on Oct. 23, 2015.

(30) Foreign Application Priority Data

Nov. 5, 2014 (KR) .................. 10-2014-0153135

(51) Int. Cl.
| | |
|---|---|
| *C09D 123/12* | (2006.01) |
| *B33Y 70/00* | (2015.01) |
| *C09D 11/34* | (2014.01) |
| *C09D 11/108* | (2014.01) |
| *B29C 64/106* | (2017.01) |
| *C09D 123/14* | (2006.01) |
| *C08F 4/659* | (2006.01) |

(52) U.S. Cl.
CPC .......... *C09D 123/12* (2013.01); *B29C 64/106* (2017.08); *B33Y 70/00* (2014.12); *C09D 11/108* (2013.01); *C09D 11/34* (2013.01); *C09D 123/14* (2013.01); *C08F 4/65912* (2013.01); *C08F 2420/02* (2013.01); *C08F 2420/06* (2013.01)

(58) Field of Classification Search
CPC .... C09D 123/12; C09D 123/14; C09D 11/34; C09D 11/108
See application file for complete search history.

(56) References Cited

U.S. PATENT DOCUMENTS

| | | |
|---|---|---|
| 6,129,872 A | 10/2000 | Jang |
| 2001/0031834 A1 | 10/2001 | Ushioda et al. |
| 2013/0211021 A1 | 8/2013 | Lee et al. |
| 2013/0211024 A1 | 8/2013 | Lee et al. |
| 2014/0287139 A1 | 9/2014 | Farmer et al. |

FOREIGN PATENT DOCUMENTS

| | | |
|---|---|---|
| CN | 102844338 A | 12/2012 |
| EP | 2599713 A1 | 6/2013 |
| JP | H08-092439 A | 9/1996 |
| JP | H09-123290 A | 5/1997 |
| JP | 2001-329006 A | 11/2001 |
| JP | 2005-531439 A | 10/2005 |
| JP | 2007-051237 A | 3/2007 |
| JP | 2013-523990 A | 6/2013 |
| JP | 2015-221526 A | 12/2015 |
| KR | 10-2005-0121558 A | 12/2005 |
| KR | 10-2011-0114476 A | 10/2011 |
| KR | 10-1394119 B1 | 5/2014 |

OTHER PUBLICATIONS

Korean Office Action for related KR Application No. 10-2014-0153135 dated Oct. 27, 2015 from Korean Patent Office.
Japanese Office Action for related JP Application No. 2015-217927 dated Aug. 9, 2016 from Japanese Patent Office.
European Search Report for EP Application No. 15192159.0 dated Mar. 23, 2016 from European Patent Office.
Philip J. Kitson, et al.: "3D Printed High-Throughput Hydrothermal Reactionware for Discovery, Optimization, and Scale-Up", Angewandte Chemie, 2014, pp. 12723-127288, vol. 53.
Manfred Kohlen: "Itespresso.de German RepRap liefert lebensmittelkonformes 3D-Druckmaterial", ITespresso.de, Jan. 16, 2014.
Chinese Office Action for related CN Application No. 201510746608.3 dated Jun. 26, 2017 from Chinese Patent Office.

*Primary Examiner* — Peter D. Mulcahy
(74) *Attorney, Agent, or Firm* — Paratus Law Group, PLLC

(57) ABSTRACT

A method of three-dimensional (3D) printing, the method including: heating a composition comprising a polymer base including atactic polypropylene having a weight average molecular weight of 50,000 to 1,000,000, a density of 0.8 to 0.9 g/ml, and isotacticity (Pentad I.I, mmmm) of 5 to 20%, wherein a melting index (210° C., 2.16 kg) of the polymer base is 0.5-30 g/10 minutes; extruding the composition as a filament; and applying the extruded filament in one or more layers, wherein a solidification rate (measuring melting indexes (MI, 150° C., 10 kg)) of the filament is less than or equal to 2 g/10 minutes and a melting rate (measuring melting indexes (MI, 180° C., 10 kg)) of the filament is greater than or equal to 10 g/10 minutes, and hardness of the polymer base is less than or equal to Shore A 90.

8 Claims, No Drawings

METHOD OF THREE-DIMENSIONAL PRINTING

CROSS REFERENCE TO PRIOR APPLICATIONS

This application is a Continuation of U.S. patent application Ser. No. 14/921,544 filed on Oct. 23, 2015, which claims priority to Korean Patent Application No. 10-2014-0153135 filed on Nov. 5, 2014, which are all hereby incorporated by reference in their entirety.

BACKGROUND

The present disclosure relates to a thermoplastic resin composition for three-dimensional printer filaments, and more particularly, to a thermoplastic resin composition for three-dimensional printer filaments applicable as a three-dimensional printing material requiring low hardness and soft feeling.

A three-dimensional (3D) printer is an apparatus for manufacturing a 3D shape by spraying inks with specific materials including a powder type one by one and laminating thereof to minute thicknesses. The utilization of 3D printing is being diffused into diverse fields. Particularly, a medical dummy capable of replacing a part of the body receives much attention, and the 3D printer is used for the manufacture of various shapes including toys and household objects such as kitchen supplies as well as automobiles including many parts.

Currently, a photocurable polymer material, i.e., a "photopolymer" which is cured on receiving light is the most widely used material for 3D printing. This material is widely used to such an extent as to occupy about 56% of the whole market and has advantages of having a rapid curing rate and forming a hard product, however has defects of hard recycling and high price. The following popular material is thermoplastic with a solid state of which melting and hardening are free. The thermoplastic occupies about 40% of the whole market, and a metal powder is expected to gradually increase a growing rate from now on. A thermoplastic material may be a filament type, a particle type or a powder type. 3D printing of the filament type is faster than other types and has high productivity and a fast diffusion rate.

As an existing filament material, polylactic acid (PLA), acrylonitrile butadiene styrene (ABS), high density polyethylene (HDPE), polycarbonate (PC), etc. are used, and the reasons are as follows. First, the melting point thereof is suitably high, and a hardening rate after printing is rapid. Thus, with an increased printing rate, modification may not be generated, and dimensional stability and shape stability may be good. Second, since the melting point is suitably low, extrusion is easy and production efficiency is high during manufacturing filaments. Further, in the case that the melting point is too high, power consumption for melting filaments is high, and parts in a printer should be manufactured using a material enduring high temperature, thereby causing unnecessary increase of production costs.

Materials satisfying the above-mentioned diverse conditions include the above-mentioned four kinds, and all of these are materials having high hardness with greater than or equal to about Shore D50. Thus, the requirements of 3D printing materials of low hardness and soft feeling could not be satisfied. A 3D printed product using a material with low hardness and soft feeling may be applied to, for example, artificial skin, artificial joint, prostheses capable of replacing a part of the body used in medical field. Thus, the development of a novel material is required.

Meanwhile, polypropylene may be classified as isotactic polypropylene (iPP), syndiotactic polypropylene (sPP), and atactic polypropylene (aPP). Among them, studies on iPP and sPP are conducted due to good mechanical properties and thermal properties thereof, however commercial development of aPP is delayed due to the limitation of physical properties due to random stereoregularity. aPP may be separated as by-products during recovering an aliphatic solvent in an initial slurry process for preparing iPP, or may be prepared as a heterogeneous catalyst using modified titanium chloride(III) and an organoaluminum compound such as diethyl aluminum chloride as a co-catalyst or activator. However, in an iPP process with improved isotacticity, noncrystalline aPP is not produced as by-products any more. Although PP with low crystallinity is produced according to the object, aPP may be obtained by adding a comonomer.

By using a metallocene catalyst system, uniform aPP with narrow molecular weight distribution from high molecular weight to low molecular weight and high activity may be obtained via the structural change of a catalyst. In addition, the physical properties of aPP are largely affected by the molecular weight. Since aPP with low molecular weight has a sticky state without shapes at room temperature and has limitations in using, the molecular weight of about 150,000 and more is required. Although aPP obtained in the above catalyst system has high molecular weight, the polymerization activity thereof is very low, or polymerization results obtained at a relatively low temperature (less than or equal to 20° C.) to obtain high molecular weight are shown. Under the background, the present applicant suggested a method of preparing aPP with high molecular weight with high activity via propylene single polymerization using a catalyst composition including a novel transition metal compound having thiophene-fused cyclopentadienyl in Korean Patent Application No. 2011-0033626.

PRIOR ART PATENT DOCUMENTS

Japanese Patent Laid-open Publication No. Hei 8-92439 (published on Apr. 9, 1996)

Korean Patent Laid-open Publication No. 2005-0121558 (published on Dec. 27, 2005)

SUMMARY

The present disclosure provides a composition for 3D printer filaments satisfying the requirements of low hardness and soft feeling as a 3D printing material, and filaments for a 3D printer manufactured using the same.

There is provided in the present disclosure a composition for 3D printer filaments including a polymer base containing atactic polypropylene having a weight average molecular weight of 50,000 to 1,000,000, a density of 0.8 to 0.9 g/ml, and isotacticity (Pentad I.I, mmmm) of 5 to 20%, wherein melting index (210° C., 2.16 kg) of the polymer base is 0.5-30 g/10 minutes.

In addition, the atactic polypropylene may be polymerized in the presence of a catalyst including a transition metal compound represented by the following Formula 1.

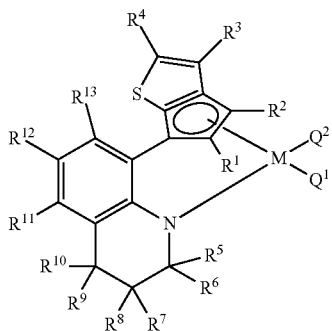

[Formula 1]

In Formula 1, M is a transition metal in group 4, $Q^1$ and $Q^2$ are each independently halogen; $(C_1-C_{20})$alkyl; $(C_2-C_{20})$alkenyl; $(C_2-C_{20})$alkynyl; $(C_6-C_{20})$aryl; $(C_1-C_{20})$alkyl$(C_6-C_{20})$aryl; $(C_6-C_{20})$aryl$(C_1-C_{20})$alkyl; $(C_1-C_{20})$alkylamido; $(C_6-C_{20})$arylamido; or $(C_1-C_{20})$alkylidene, $R^1$ to $R^{10}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; or $(C_1-C_{20})$silyl including or not including acetal, ketal or an ether group, where $R^1$ and $R^2$ may be connected to each other to form a ring, and at least two of $R^6$ to $R^{10}$ may be connected to each other to form a ring, $R^3$ and $R^4$ are each independently hydrogen or methyl, where at least one of $R^3$ and $R^4$ is methyl, $R^5$ is $(C_1-C_{20})$alkyl including or not including acetal, ketal or an ether group, $R^{11}$, $R^{12}$ and $R^{13}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; $(C_1-C_{20})$silyl including or not including acetal, ketal or an ether group; $(C_1-C_{20})$alkoxy; or $(C_6-C_{20})$aryloxy, where $R^{11}$ and $R^{12}$, or $R^{12}$ and $R^{13}$ are connected to each other to form a ring.

In addition, the atactic polypropylene may be a homopolymer, or a block copolymer or a random copolymer with at least one olefin selected from the group consisting of ethylene, butene, hexene, octene and styrene.

In addition, the polymer base may further include at least one selected from the group consisting of homo polypropylene, a propylene-ethylene block copolymer and random polypropylene having a glass transition temperature of greater than or equal to −5° C.

In addition, the present disclosure also provides a filament for a 3D printer manufactured via extrusion of the composition.

According to the present invention, a composition for 3D printer filaments satisfying the requirements of low hardness and soft feeling as a 3D printing material including a polymer base including high molecular weight aPP prepared by using a catalyst composition including a novel transition metal compound having thiophene-fused cyclopentadienyl, and a filament for a 3D printer manufactured using the same are provided.

In addition, since the composition for 3D printer filaments according to the present invention has a low melting point, may be molten with a small amount of energy and may be rapidly solidified at room temperature, the provision of raw materials as a filament type may be possible. Accordingly, lamination and molding via a nozzle may be very easy, and an enormous size product may be rapidly manufactured. In addition, since a resin itself is transparent, there is no restriction for coloring, and coloring is free. Further, polypropylene is harmless to a human body, and may be effectively used for the manufacture of recently spotlighted human body organs, artificial skin, etc.

DETAILED DESCRIPTION OF EMBODIMENTS

Hereinafter, preferred embodiments of the present invention will be described in detail. In the description of the present invention, in the case that particular explanation on known techniques is considered to obscure the gist of the present invention, the detailed description thereof will be omitted. It will be understood that when a part "includes" an element, the part may not exclude other elements but may further include other elements throughout, unless the context clearly indicates otherwise.

The inventors of the present invention repeated close studies to develop a composition for 3D printer filaments satisfying the requirements of low hardness and soft feeling as a 3D printing material, and found that a composition for 3D printer filaments satisfying the requirements of low hardness and soft feeling as a 3D printing material may be provided by including a polymer base including high molecular weight aPP prepared by using a catalyst composition including a novel transition metal compound having thiophene-fused cyclopentadienyl, thereby completing the present invention.

The present invention discloses a composition for 3D printer filaments characterized in including atactic polypropylene having a weight average molecular weight of 50,000 to 1,000,000, a density of 0.8 to 0.9 g/ml, and isotacticity (Pentad I.I, mmmm) of 5 to 20%, wherein the melting index (210° C., 2.16 kg) of the polymer base is 0.5-30 g/10 minutes.

A common polypropylene resin has a high hardness and crystallinity at room temperature, however atactic polypropylene maintains soft properties at room temperature and has no crystallinity. Thus, in the case of applying the atactic polypropylene as a 3D printer material, the following merits may be obtained.

First, the printing of a product may be conducted with a small amount of energy, because the fusibility is very good. In the case that an atactic polypropylene resin is used as the 3D printer material, the material may be molten at the temperature less than or equal to 100° C. and may be rapidly solidified at room temperature. Accordingly, a raw material may be supplied as a filament type at room temperature, the raw material may be molten by a small amount of heat after being supplied to a 3D printer, and lamination via nozzles may be very easily conducted.

As another advantage, the atactic polypropylene is transparent, and the manufacture of filaments with diverse colors may be possible. Polymers according to the present invention have a noncrystalline state on the basis of the conformation thereof and maintain a transparent state. Thus, products with any color may be obtained as well as transparent products. Since the resin may be easily molten, and coloring thereof is possible, the synthesis of colors in nozzles may be possible as the toner of a color printer, thereby realizing infinite colors.

Finally, the atactic polypropylene is environmentally very stable and harmless to human. Common polypropylene widely used as a packaging material of foods, diverse medical apparatuses, etc. could be infinitely recycled, and the stability on the effects to human body has been sufficiently verified. The polypropylene to be used in the present disclosure also has the same chemical structure, and the stability of a product is very good. Accordingly, the use thereof for the manufacture of human body organs, artificial skin, etc. used in a human body recently spotlighted in a 3D printer region is very positive.

Generally, 3D printing includes the use of an inkjet printing head for transferring a liquid or colloidal binder material to the layer of a powdered build material. Printing technique of the powdered build material includes coating a layer of the powdered build material on a surface commonly using a roller. After coating a material on the surface of a forming product, a printing head transfers a liquid binder to a predetermined region of a material layer. The binder penetrates into the material and reacts with a powder to form an interlayer bonding. After forming a first cross-section, the former steps are repeated to form continuous cross-sections until a final target is formed. However, an apparatus for conducting 3D printing commonly generates dust that may harmfully influence the operation of a printing head. For example, the dust may block jet nozzles for distributing the binder material, and the binder material may not be distributed, or contamination due to incorrect distribution may arise.

To solve the defects, the composition for 3D printer filaments according to the present invention may be applied as a specialized raw material so as to be coated as a molten state not as a powder. For conducting 3D printing, a raw material is to be supplied as a filament type, a rapid solidification after coating from nozzles is to be achieved, and continuous interlayer coating is to be performed. The composition for 3D printer filaments according to the present invention is a thermoplastic resin, has a glass transition temperature of less than or equal to −10° C., has a soft type at room temperature and may be molten with a relatively small amount of heating source. Thus, the economic, safe and continuous molding of a product is possible in manufacturing products.

In the present invention, the atactic polypropylene may be synthesized in the presence of a catalyst including a specific transition metal compound which will be explained hereinafter.

The atactic polypropylene has a weight average molecular weight of 50,000 to 1,000,000, a density of 0.8 to 0.9 g/ml, and isotacticity (Pentad I.I, mmmm) of 5 to 20%. Preferably, the weight average molecular weight may be 100,000 to 800,000, the density may be 0.82 to 0.9 g/ml, and the isotacticity (Pentad I.I, mmmm) may be 5 to 15%. More preferably, the weight average molecular weight may be 200,000 to 500,000, the density may be 0.82 to 0.89 g/ml, and the isotacticity (Pentad I.I, mmmm) may be 5 to 10%. In addition, the molecular weight distribution (Mw/Mn) of the atactic polypropylene may preferably be 1 to 10, may more preferably be 1.5 to 8, and may the most preferably be 2 to 6. In the case that the weight average molecular weight is less than 50,000, the atactic polypropylene has a sticky state at room temperature, and the use thereof may be limited. In the case that the weight average molecular weight is greater than 1,000,000, the flowability of a resin is deteriorated, and formability may be undesirable.

The atactic polypropylene may be used alone, or may be used as a mixture with commercial polypropylene. In this case, the atactic polypropylene may be included in an amount ratio of 1 to 50 wt %, preferably, 3 to 15 wt %, and more preferably, 5 to 10 wt % in a total resin composition. In the case that the amount of the atactic polypropylene is less than 1 wt %, sufficient impact strength at a low temperature may not be imparted, and in the case that the amount is greater than 50 wt %, mechanical strength and heat-resistance may be deteriorated.

The atactic polypropylene may be prepared referring to Korean Patent Application No. 2011-0033626 suggested by the present applicant. That is, the atactic polypropylene may be obtained by polymerization in the presence of a catalyst including a transition metal compound represented by the following Formula 1.

[Formula 1]

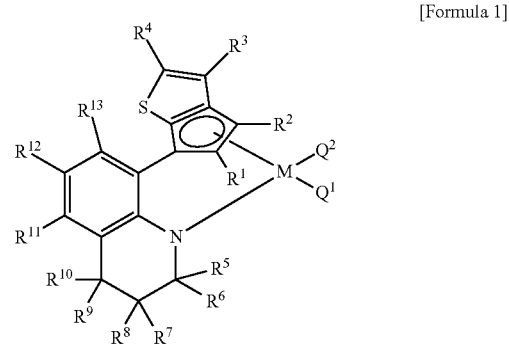

In Formula 1, M is a transition metal in group 4, $Q^1$ and $Q^2$ are each independently halogen, $(C_1-C_{20})$alkyl; $(C_2-C_{20})$alkenyl; $(C_2-C_{20})$alkynyl; $(C_6-C_{20})$aryl; $(C_1-C_{20})$alkyl$(C_6-C_{20})$aryl; $(C_6-C_{20})$aryl$(C_1-C_{20})$alkyl; $(C_1-C_{20})$alkylamido; $(C_6-C_{20})$arylamido; or $(C_1-C_{20})$alkylidene, $R^1$ to $R^{10}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; or $(C_1-C_{20})$silyl including or not including acetal, ketal or an ether group, where $R^1$ and $R^2$ may be connected to each other to form a ring, and at least two of $R^6$ to $R^{10}$ may be connected to each other to form a ring, $R^3$ and $R^4$ are each independently hydrogen or methyl, where at least one of $R^3$ and $R^4$ is methyl, $R^5$ is $(C_1-C_{20})$alkyl including or not including acetal, ketal or an ether group, and $R^{11}$, $R^{12}$ and $R^{13}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; $(C_1-C_{20})$silyl including or not including acetal, ketal or an ether group; $(C_1-C_{20})$alkoxy; or $(C_6-C_{20})$aryloxy, where $R^{11}$ and $R^{12}$, or $R^{12}$ and $R^{13}$ are connected to each other to form a ring.

In this case, the transition metal compound of Formula 1 may be activated by a co-catalyst compound to impart activity to the polymerization reaction of propylene, and the co-catalyst compound may be any compound that may activate the transition metal compound of Formula 1 while not deteriorating the activity of a catalyst including the transition metal compound, without limitation. As the co-catalyst compound, compounds represented by the following Formulae 2 to 4 may be used.

$$-[Al(R^{21})-O]_a-$$ [Formula 2]

$R^{21}$ is independently halogen radical, $(C_1-C_{20})$hydrocarbyl radical or halogen substituted $(C_1-C_{20})$hydrocarbyl radical; and a is an integer greater than or equal to 2.

$$D(R^{31})_3$$ [Formula 3]

D is aluminum or boron; $R^{31}$ is independently halogen radical, $(C_1-C_{20})$hydrocarbyl radical or halogen substituted $(C_1-C_{20})$hydrocarbyl radical.

$$[L-H]^+[Z(A)_4]^- \text{ or } [L]^+[Z(A)_4]^-$$ [Formula 4]

L is a neutral or cationic Lewis acid; Z is an element in group 13; A is independently $(C_6-C_{20})$aryl or $(C_1-C_{20})$alkyl radical in which at least one of hydrogen atoms are substituted with halogen, $(C_1-C_{20})$hydrocarbyl, $(C_1-C_{20})$alkoxy or $(C_6-C_{20})$aryloxy radical.

The preparation of the atactic polypropylene in the present invention may be performed by polymerizing propylene in the presence of the catalyst compound, according to a known method in a slurry phase, a liquid phase, a gas phase or a cluster phase. The polymerization may be performed by a batch type, a semi-continuous type or a continuous type reaction, and particular preparation method may refer to Korean Patent Application No. 2011-0033626 suggested by the present applicant.

The atactic polypropylene may have a melting point peak temperature of 130 to 180° C. during thermal analysis by differential scanning calorimeter (DSC), and the melting index (190° C., 2.16 kg) of the composition obtained by mixing various additive components may be 0.5 to 30 g/10 minutes, preferably, 1 to 20 g/10 minutes, and more preferably, 1 to 10 g/10 minutes. The hardness thereof may be less than or equal to Shore A 90. In the case that the melting index is less than 1 g/10 minutes, the dissolving rate of the filaments is slow, and smooth printing may not be available, or situation of decreasing a printing rate may be generated. In the case that the melting index is greater than 30 g/10 minutes, the filaments may dissolve too rapidly, and the maintenance of a constant amount of discharge at a constant rate may be difficult, thereby generating a large deviation of printing thickness.

An olefin polymer material forming the atactic polypropylene may use propylene alone, or a block copolymer or random copolymer type of ethylene. In addition, butene, hexene, octene, etc. may be used as a material for forming a copolymer other than ethylene, and aromatic styrene, etc. may be more preferable in consideration of physical properties, moldability, etc. In this case, the amount of olefin copolymerized with propylene may be 1 to 50 wt %, and preferably may be, 5 to 30 wt %.

In addition, commonly commercialized polypropylene may be used as the polymer base, and in this case, the commercialized polypropylene may be used in an amount ratio of 50 to 99 wt %, preferably, 85 to 97 wt %, and more preferably, 90 to 95 wt % in the polymer base. As the commercialized polypropylene, homopolypropylene, a propylene-ethylene block copolymer, random polypropylene having a glass transition temperature greater than or equal to −5° C., etc. may be used.

According to another aspect of the present invention, filaments for a 3D printer manufactured by extruding the composition may be provided. The filament includes a polymer base containing atactic polypropylene. The hardness of the polymer base may be less than or equal to Shore A 90. The melting index (190° C., 2.16 kg) of the polymer base may be 1 to 30 g/10 minutes, and the melting index (150° C., 10 kg) may be less than or equal to 3 g/10 minutes. The melting index (150° C., 10 kg) may preferably be 0.01 to 2 g/10 minutes, and more preferably, 0.01 to 1 g/10 minutes. Thus, the filament has a rapid solidification rate and excellent slipping property. As described above, the atactic polypropylene may have a melting point peak temperature of 130 to 180° C. during thermal analysis by DSC, and the power consumption for dissolving filaments in the above melting point range may be small, and the extrusion may be easy.

The size of the filaments for a 3D printer is not specifically limited in the present invention, however, may preferably be 0.5 to 3 mm, may more preferably be 1 to 2 mm, and may the most preferably be 1.5 to 1.8 mm. In the case that the diameter of the filament is less than 0.5 mm, the manufacture of a printing head pushing the filaments may be difficult, and printing rate may be too slow. In the case that the diameter is greater than 3 mm, a solidification rate may be slow, and printing line may become thick, thereby deteriorating the degree of precision. The hardness of the filaments may be less than or equal to Shore A 90. In the case that the hardness is greater than Shore A 90, soft feeling such as rubber may not be felt, and the object of the present invention may not be accomplished.

The method of manufacturing a product via 3D printing using the filaments for a 3D printer may be conducted as follows. First, the filaments for a 3D printer are supplied to a printing head. The filaments may be supplied to the printing head via an induction pipe. Then, the heated and molten product of the filaments for a 3D printer was discharged from the printing head. The lower plate of the printer moves in y-axis, and the printing head moves in x-axis, while laminating one layer. Then, a layer is raised up in z-axis, and the next layer is laminated via the movement in x-axis and y-axis, and stereoscopic printing may be performed by such a printing method. Then, the molten product is solidified, and a printed layer is formed. A plurality of the printing layers is laminated to form a solid product.

Hereinafter, examples of the present invention will be explained in detail so that a person skilled in the art may easily conduct. However, the following examples are for illustration of the present invention, and the present invention is not limited to the following examples.

Example 1

100 parts by weight of atactic polypropylene (weight average molecular weight (measured by a GPC analysis method, PL-GPC220, Agilent) of 300,000, molecular weight distribution (Mw/Mn) of 5, I. I. (%, mmmm) of 9.3, density of 0.84 g/ml, DSC melting point of 145° C.) prepared by the following process was extruded using a single screw extruder having a screw diameter of 30 mm and a screw length of 105 mm, cooled in a cooling bath having a length of 1.5 m and wrapped to manufacture a filament with a diameter of 1.75 mm.

[Method of Preparing Atactic Polypropylene]

Korean Patent Application No. 2011-0033626 was referred to. The inside of a high pressure reactor (inner volume: 2 L, stainless steel) was substituted with nitrogen at room temperature. About 4.0 mL of a methylaluminoxane toluene solution (a 10 wt % solution of methylaluminoxane in toluene, 6 mmol on the basis of Al, manufacturer: Albemarle) was added to the reactor, and 500 g of propylene was added thereto, followed by elevating the temperature to 70° C. Then, a solution obtained by dissolving a transition metal compound represented by the following Formula 5 in toluene (1.5 mL, 3.0 μmol of Ti) was injected into the reactor to perform polymerization. After performing the polymerization reaction, the temperature was decreased to room temperature, residual propylene was removed, and a polymer was recovered. The polymer thus obtained was dried by heating in a vacuum oven at 80° C. for 4 hours or more to produce polypropylene.

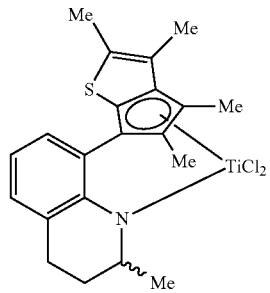

[Formula 5]

Example 2

The same procedure was performed as that in Example 1 except for using an atactic polypropylene copolymer containing 20 wt % of ethylene (DSC melting point of 120° C.) to produce filaments.

Example 3

The same procedure was performed as that in Example 1 except for using an atactic polypropylene copolymer containing 20 wt % of butene (DSC melting point of 110° C.) to produce filaments.

Comparative Example 1

The same procedure was performed as that in Example 1 except for using an ethylene octene random copolymer (EOR) (DSC melting point of 90° C.) instead of the atactic polypropylene to produce filaments.

Comparative Example 2

The same procedure was performed as that in Example 1 except for using an ethylene vinyl acetate copolymer (EVA) (DSC melting point of 80° C.) instead of the atactic polypropylene to produce filaments.

Comparative Example 3

The same procedure was performed as that in Example 1 except for using styrene ethylene butylene styrene (SEBS) (DSC melting point of 140° C.) instead of the atactic polypropylene to produce filaments.

Experimental Example

With respect to the filaments manufactured according to the examples and comparative examples, solidification rates and melting rates were evaluated by the following methods, and the results are shown in Table 1.

[Evaluation Methods]

(1) Solidification Rate

The melting indexes (MI) of the filament compositions were measured by ASTM-1238. The composition with MI (150° C., 10 kg) of less than or equal to 1 g/10 minutes was designated by A, of 1.1 to 2 g/10 minutes was designated by B, of 2.1 to 3 g/10 minutes was designated by C, of 3.1 to 5 g/10 minutes was designated by D, and of greater than or equal to 5.1 g/10 minutes was designated by E. That is, the solidification rate at 150° C. was decreased according to the increase of the MI (150° C., 10 kg).

(2) Melting Rate

The composition with MI (180° C., 10 kg) of greater than or equal to 20 g/10 minutes was designated by A, of greater than or equal to 10 g/10 minutes was designated by B, of greater than or equal to 5 g/10 minutes was designated by C, of greater than or equal to 1 g/10 minutes was designated by D, and of less than 1 g/10 minutes was designated by E. The melting rate was decreased according to the decrease of the MI (180° C., 10 kg), thereby decreasing a printing rate or resulting in impossible printing.

TABLE 1

| Division | Example 1 | Example 2 | Example 3 | Comparative Example 1 | Comparative Example 2 | Comparative Example 3 |
|---|---|---|---|---|---|---|
| MI (190° C., 2.16 kg) | 2 | 3 | 3 | 2 | 8 | 0.5 |
| Melting rate | B | A | A | B | B | C |
| Solidification rate | B | A | B | D | E | C |
| Filament suitability | Suitable | Suitable | Suitable | Unsuitable | Unsuitable | Unsuitable |

Referring to Table 1, the filament compositions including a polymer base including high molecular weight atactic polypropylene prepared using a catalyst composition including a specific transition metal compound according to the present invention (Examples 1 to 3) have a rapid meting rate and a solidification rate and good properties when compared to the filament compositions not including the atactic polypropylene (Comparative Examples 1 to 3), and may be appropriately used as the filaments of a 3D printer. Meanwhile, since the filament compositions according to the present invention has low hardness, the production of various shapes requiring soft feeling during 3D printing may be secured.

Although the preferred embodiments have been described in detail, the embodiments of the present invention were for illustration, and it will be readily understood by those skilled in the art that various modifications and changes can be made thereto without departing from the spirit and scope of the present invention defined by the appended claims.

Accordingly, the scope of the present invention may be embodied not by the above detailed description but by the appended claims, and it should be interpreted that all changes or modified shapes derived from the meaning, scope and equivalent concept of the appended claims should be included in the scope of the present invention.

What is claimed is:

1. A method of three-dimensional (3D) printing, the method comprising:
heating a composition comprising a polymer base including atactic polypropylene having a weight average molecular weight of 50,000 to 1,000,000, a density of 0.8 to 0.9 g/ml, and isotacticity (Pentad I.I, mmmm) of 5 to 20%, wherein a melting index (210° C., 2.16 kg) of the polymer base is 0.5-30 g/10 minutes;
extruding the composition as a filament; and
applying the extruded filament in one or more layers,
wherein a solidification rate (measuring melting indexes (MI, 150° C., 10 kg)) of the filament is less than or equal to 2 g/10 minutes and a melting rate (measuring melting indexes (MI, 180° C., 10 kg)) of the filament is greater than or equal to 10 g/10 minutes, and
wherein hardness of the polymer base is less than or equal to Shore A 90.

2. The method of claim 1, further comprising:
polymerizing the atactic polypropylene in the presence of a catalyst including a transition metal compound represented by the following Formula 1:

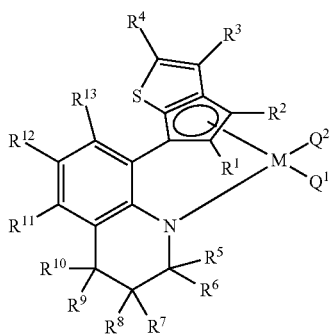

[Formula 1]

wherein M is a transition metal in group 4,
wherein Q1 and Q2 are each independently halogen; (C1-C20) alkyl; (C2-C20)alkenyl; (C2-C20)alkynyl; (C6-C20)aryl; (C1-C20)alkyl(C6-C20)aryl; (C6-C20) aryl(C1-C20)alkyl; (C1-C20)alkylamido; (C6-C20) arylamido; or (C1-C20)alkylidene,
wherein R1 to R10 are each independently hydrogen; (C1-C20)alkyl including or not including acetal, ketal or an ether group; (C2-C20)alkenyl including or not including acetal, ketal or an ether group; (C1-C20)alkyl (C6-C20)aryl including or not including acetal, ketal or an ether group; (C6-C20)aryl(C1-C20)alkyl including or not including acetal, ketal or an ether group; or (C1-C20)silyl including or not including acetal, ketal or an ether group, where R1 and R2 may be connected to each other to form a ring, and at least two of R6 to R10 may be connected to each other to form a ring,
wherein R3 and R4 are each independently hydrogen or methyl, where at least one of R3 and R4 is methyl,
wherein R5 is (C1-C20)alkyl including or not including acetal, ketal or an ether group, and
wherein R11, R12 and R13 are each independently hydrogen; (C1-C20)alkyl including or not including acetal, ketal or an ether group; (C2-C20)alkenyl including or not including acetal, ketal or an ether group; (C1-C20) alkyl(C6-C20)aryl including or not including acetal, ketal or an ether group; (C6-C20)aryl(C1-C20)alkyl including or not including acetal, ketal or an ether group; (C1-C20)silyl including or not including acetal, ketal or an ether group; (C1-C20)alkoxy; or (C6-C20) aryloxy, where R11 and R12, or R12 and R13 are connected to each other to form a ring.

3. The method of claim 1, wherein the atactic polypropylene comprises at least one of a homopolymer, a block copolymer, and a random copolymer with at least one olefin selected from a group consisting of ethylene, butene, hexene, octene and styrene.

4. The method of claim 1, wherein the polymer base further comprises at least one selected from a group consisting of homo polypropylene, a propylene-ethylene block copolymer, and random polypropylene having a glass transition temperature of greater than or equal to −5° C.

5. The method of claim 2, wherein the polymer base further comprises at least one selected from a group consisting of homo polypropylene, a propylene-ethylene block copolymer, and random polypropylene having a glass transition temperature of greater than or equal to −5° C.

6. The method of claim 3, wherein the polymer base further comprises at least one selected from a group consisting of homo polypropylene, a propylene-ethylene block copolymer, and random polypropylene having a glass transition temperature of greater than or equal to −5° C.

7. The method of claim 2, wherein the atactic polypropylene comprises at least one of a homopolymer, a block copolymer, and a random copolymer with at least one olefin selected from a group consisting of ethylene, butene, hexene, octene and styrene.

8. The method of claim 7, wherein the polymer base further comprises at least one selected from a group consisting of homo polypropylene, a propylene-ethylene block copolymer, and random polypropylene having a glass transition temperature of greater than or equal to −5° C.

* * * * *